United States Patent [19]
Quick et al.

[11] 4,191,635
[45] Mar. 4, 1980

[54] PROCESS FOR THE CRACKING OF HEAVY HYDROCARBON STREAMS

[75] Inventors: Leonard M. Quick, Naperville, Ill.; Albert L. Hensley, Jr., Munster, Ind.

[73] Assignee: Standard Oil Company (Indiana), Chicago, Ill.

[21] Appl. No.: 967,416

[22] Filed: Dec. 7, 1978

Related U.S. Application Data

[63] Continuation-in-part of Ser. No. 862,846, Dec. 21, 1977, abandoned.

[51] Int. Cl.$^2$ ............................................. C10G 23/02
[52] U.S. Cl. ........................... 208/89; 208/251 H; 208/254 H; 208/216 PP; 208/211
[58] Field of Search ............... 208/89, 216 PP, 216 R, 208/254 H, 251 H

[56] References Cited

U.S. PATENT DOCUMENTS

| | | | |
|---|---|---|---|
| 2,577,823 | 12/1951 | Stine | 208/216 R |
| 3,114,701 | 12/1963 | Jacobson et al. | 208/254 H |
| 3,245,919 | 4/1966 | Gring et al. | 208/216 PP |
| 3,265,615 | 8/1966 | Buss | 208/254 H |
| 3,340,180 | 9/1967 | Beuther et al. | 208/216 PP |
| 3,393,148 | 7/1968 | Bertolacini et al. | 208/216 PP |
| 3,700,586 | 10/1972 | Schulman | 208/89 |
| 3,956,105 | 5/1976 | Conway | 208/216 R |
| 3,977,961 | 8/1976 | Hamner | 208/251 H |
| 4,008,149 | 2/1977 | Itoh et al. | 208/241 H |
| 4,066,574 | 1/1978 | Tamm | 208/216 PP |

FOREIGN PATENT DOCUMENTS

| | | | |
|---|---|---|---|
| 2281972 | 3/1976 | France | 208/216 PP |
| 1367243 | 9/1974 | United Kingdom | 208/216 PP |

*Primary Examiner*—George Crasanakis
*Attorney, Agent, or Firm*—James L. Wilson; Arthur G. Gilkes; William T. McClain

[57] ABSTRACT

A heavy hydrocarbon stream containing metals, asphaltenes, nitrogen compounds, and sulfur compounds is (a) contacted with hydrogen and a hydrotreating catalyst containing molybdenum and chromium, either as metals, as oxides, as sulfides, or mixtures thereof, deposed on a large-pore, catalytically active alumina to reduce the metals content in said stream, to convert the asphaltenes, nitrogen compounds, and sulphur compounds in said stream, the catalyst has a pore volume within the range of about 0.4 cc/gm to about 0.8 cc/gm, a surface area within the range of about 150 m$^2$/gm to about 300 m$^2$/gm, and an average pore diameter within the range of about 100 Å (10 nm) to about 200 Å (20 nm); and (b) at least a portion of the hydrotreated stream is cracked with a cracking catalyst to produce gasoline and distillates in improved yields. The catalyst in step (a) may also contain cobalt.

35 Claims, 1 Drawing Figure

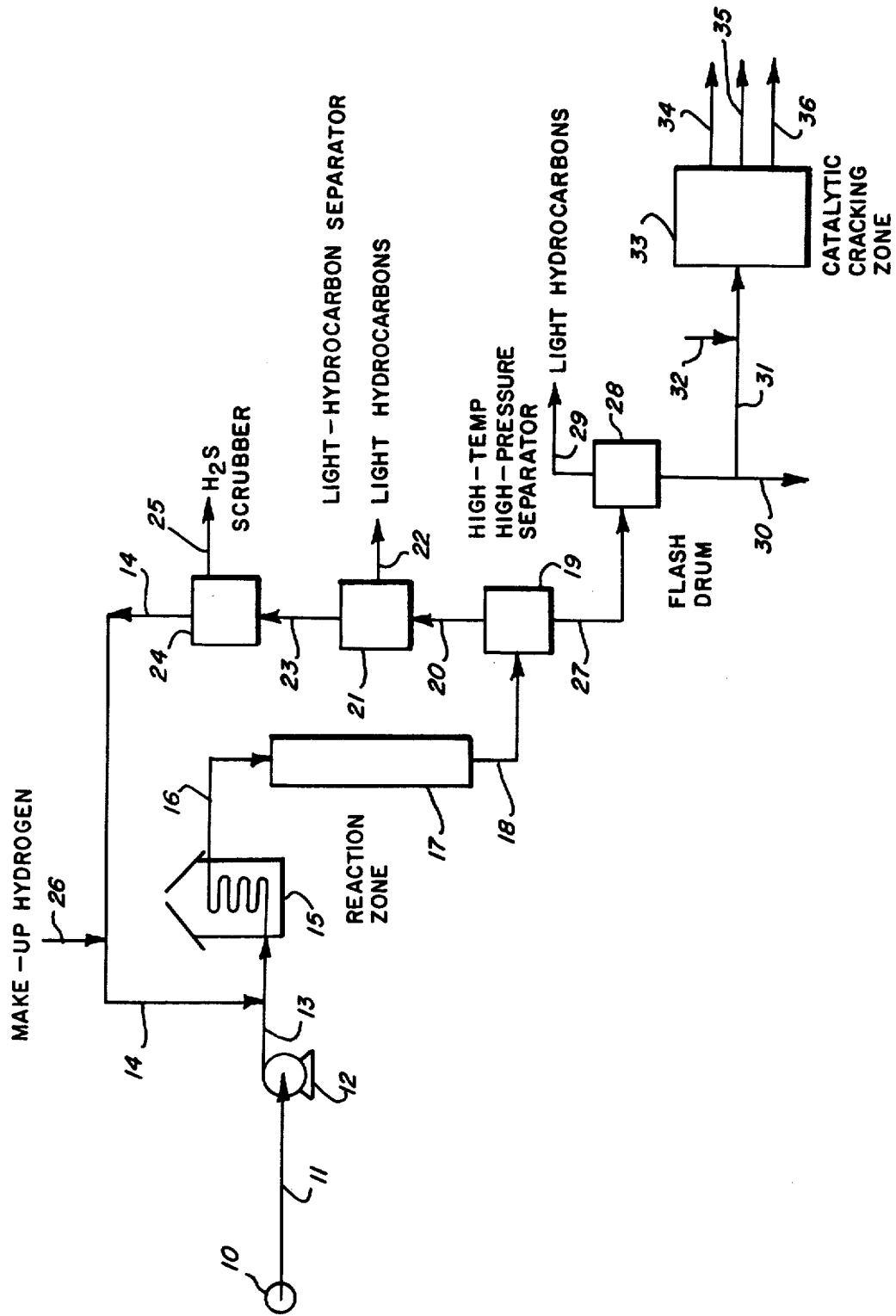

PROCESS FOR THE CRACKING OF HEAVY HYDROCARBON STREAMS

CROSS-REFERENCE TO RELATED APPLICATIONS

This application is a continuation-in-part application of copending application U.S. Ser. No. 862,846, which was filed in the U.S. Patent and Trademark Office on Dec. 21, 1977, now abandoned.

Two applications are being filed concurrently herewith.

The first of these, U.S. Ser. No. 967,432, is directed broadly to a process for hydrotreating a heavy hydrocarbon stream containing metals, asphaltenes, nitrogen compounds, and sulfur compounds, which process comprises contacting said stream under suitable conditions and in the presence of hydrogen with a catalyst comprising a hydrogenating component consisting essentially of a member selected from the group consisting of (1) molybdenum and chromium, (2) their oxides, (3) their sulfides, and (4) mixtures thereof on a large-pore, catalytically active alumina, said molybdenum being present in an amount within the range of about 5 wt.% to about 15 wt.%, calculated as $MoO_3$ and based upon the total catalyst weight, said chromium being present in an amount within the range of about 5 wt.% to about 20 wt.%, calculated as $Cr_2O_3$ and based upon the total catalyst weight, and said catalyst having a pore volume within the range of about 0.4 cc/gm to about 0.8 cc/gm, a surface area within the range of about 150 $m^2$/gm to about 300 $m^2$/gm, and an average pore diameter within the range of about 100 Å. (10 nm) to about 200 Å. (20 nm).

The second related application, U.S. Ser. No. 967,413, is directed to a process which comprises contacting a heavy hydrocarbon stream under suitable conditions and in the presence of hydrogen with a catalyst comprising a hydrogenating component selected from the group consisting of (1) molybdenum, chromium, and a small amount of cobalt, (2) their oxides, (3) their sulfides, and (4) mixtures thereof deposed on a large-pore, catalytically active alumina. The molybdenum is present in an amount within the range of about 5 wt.% to about 15 wt.%, calculated as $MoO_3$ and based upon total catalyst weight, the chromium is present in an amount within the range of about 5 wt.% to about 20 wt.%, calculated as $Cr_2O_3$ and based upon the total catalyst weight, and the cobalt is present in an amount within the range of about 0.1 wt.% to about 5 wt.%, calculated as CoO and based upon the total catalyst weight. The catalyst possesses a pore volume within the range of about 0.4 cc/gm to about 0.8 cc/gm, a surface area within the range of about 150 $m^2$/gm to about 300 $m^2$/gm, and an average pore diameter within the range of about 100 Å. (10 nm) to about 200 Å. (20 nm).

BACKGROUND OF THE INVENTION

This invention is related to the catalytic treatment of heavy hydrocarbon streams containing asphaltenic material, metals, nitrogen compounds, and sulfur compounds. The heavy hydrocarbon stream is first hydrotreated in the presence of hydrogen with a suitable hydrotreating catalyst having specific properties to reduce the metals content and convert asphaltenes, nitrogen compounds, and sulfur compounds and at least a portion of the hydrotreated effluent is then catalytically cracked.

It is widely known that various organometallic compounds and asphaltenes are present in petroleum crude oils and other heavy petroleum hydrocarbon streams, such as petroleum hydrocarbon residua, hydrocarbon streams derived from tar sands, and hydrocarbon streams derived from coals. The most common metals found in such hydrocarbon streams are nickel, vanadium, and iron. Such metals are very harmful to various petroleum refining operations, such as hydrocracking, hydrodesulfurization, and catalytic cracking. The metals and asphaltenes cause interstitial plugging of the catalyst bed and reduced catalyst life. The various metal deposits on a catalyst tend to poison or deactivate the catalyst. Moreover, the asphaltenes tend to reduce the susceptibility of the hydrocarbons to desulfurization. If a catalyst, such as a desulfurization catalyst or a fluidized cracking catalyst, is exposed to a hydrocarbon fraction that contains metals and asphaltenes, the catalyst will become deactivated rapidly and will be subject to premature removal from the particular reactor and replacement by new catalyst.

Although processes for the hydrotreating of heavy hydrocarbon streams, including but not limited to heavy crudes, reduced crudes, and petroleum hydrocarbon residua, are known, the use of fixed-bed catalytic processes to convert such feedstocks without appreciable asphaltene precipitation and reactor plugging and with effective removal of metals and other contaminants, such as sulfur compounds and nitrogen compounds, are not too common. While the heavy portions of hydrocarbon streams once could be used as a low-quality fuel or as a source of asphaltic-type materials, the politics and economics of today require that such material be hydrotreated to remove environmental hazards therefrom and to obtain a greater proportion of usable products from such feeds.

It is well known that petroleum hydrocarbon streams can be hydrotreated, i.e., hydrodesulfurized, hydrodenitrogenated, and/or hydrocracked, in the presence of a catalyst comprising a hydrogenating component and a suitable support material, such as an alumina, an alumina-silica, or silica-alumina. The hydrogenating component comprises one or more metals from Group VI and/or Group VIII of the Periodic Table of Elements, such as the Periodic Table presented on page 628 of WEBSTER'S SEVENTH NEW COLLEGIATE DICTIONARY, G. & C. Merriam Company, Springfield, Mass., U.S.A. (1963). Such combinations of metals as cobalt and molybdenum, nickel and molybdenum, cobalt, nickel, and molybdenum, and nickel and tungsten have been found useful. For example, U.S. Pat. No. 3,340,180 teaches that heavy hydrocarbon streams containing sulfur, asphaltic materials, and metalliferous compounds as contaminants can be hydrotreated in the presence of a catalyst comprising such metal combination and an activated alumina having less than 5% of its pore volume that is in the form of pores having a radius of 0 Angstrom units [Å] (0 nm) to 300 Å. (30 nm) in pores larger than 100 Å. (10 nm) radius and having less than 10% of said pore volume in pores larger than 80 Å. (8 nm) radius.

U.S. Pat. No. 4,016,067 discloses that heavy hydrocarbon streams can be demetalated and desulfurized in a dual catalyst system in which the first catalyst comprises a Group VI metal and a Group VIII metal, preferably molybdenum and cobalt, composited with an alumina support having a demonstrable content of delta and/or theta alumina and has at least 60% of its pore volume in pores having a diameter of about 100 Å. (10 nm) to 200 Å. (20 nm), at least about 5% of the pore volume in pores greater than 500 Å. (50 nm) in diameter, and a surface area of up to about 110 square meters per gram (m²/gm) and in which the second catalyst comprises a similar hydrogenating component composited with a refractory base, preferably alumina, and has at least 50%, and preferably at least 60%, of its pore volume contributed by pores that have a diameter of 30 Å. (3 nm) to 100 Å. (10 nm) and a surface area of at least 150 m²/gm.

U.S. Pat. No. 2,890,162 teaches that catalysts comprising active catalytic components on alumina and having a most frequent pore diameter of 60 Å. (6 nm) to 400 Å. (40 nm) and pores which may have diameters in excess of 1,000 Å. (100 nm) are suitable for desulfurization, hydrocracking, hydroforming of naphthene hydrocarbons, alkylation, reforming of naphthas, isomerization of paraffins and the like, hydrogenation, dehydrogenation, and various types of hydrofining operations, and hydrocracking of residua and other asphalt-containing materials. It is suggested that suitable active components and promoters comprise a metal or a catalytic compound of various metals, molybdenum and chromium being among 35 listed metals.

U.K. Pat. No. 1,051,341 discloses a process for the hydrodealkylation of certain aromatics, which process employs a catalyst consisting of the oxides or sulfides of a Group VI metal supported on an alumina, having a porosity of 0.5 milliliters per gram (ml/gm) to 1.8 ml/gm and a surface area of 138 m²/gm to 200 m²/gm, at least 85% of the total porosity being due to pores having a diameter of 150 Å. (15 nm) to 550 Å. (55 nm).

U.S. Pat. Nos. 3,245,919 and 3,267,025 disclose hydrocarbon conversion processes, such as reforming, hydrocracking, hydrodesulfurization, isomerization, hydrogenation, and dehydrogenation, that employ a catalyst of a catalytic amount of a metal component selected from metals of Group VI and Group VIII, such as chromium, molybdenum, tungsten, iron, nickel, cobalt, and the platinum group metals, their compounds, and mixtures thereof, supported on gamma-alumina obtained by the drying and calcining of a boehmite alumina product and having a pore structure totalling at least about 0.5 cc/gm in pores larger than 80 Å. (8 nm) in size.

U.S. Pat. No. 3,630,888 teaches the treatment of residuum hydrocarbon feeds in the presence of a catalyst comprising a promoter selected from the group consisting of the elements of Group VIB and Group VIII of the Periodic Table, oxides thereof, and combinations thereof, and a particulate catalytic agent of silica, alumina, and combinations thereof, having a total pore volume greater than 0.40 cubic centimeters per gram (cc/gm), which pore volume comprises micropores and access channels, the access channels being interstitially spaced through the structure of the micropores, a first portion of the access channels having diameters between about 100 Å. (10 nm) and about 1,000 Å. (100 nm), which first portion comprises 10% to 40% of the pore volume, and the remainder of the pore volume being micropores having diameters of less than 100 Å. (10 nm), which remainder comprises 20% to 80% of the total pore volume.

U.S. Pat. No. 3,114,701, while pointing out that in hydrofining processes nitrogen compounds are removed from petroleum hydrocarbons in the presence of various catalysts generally comprising chromium and/or molybdenum oxides together with iron, cobalt, and/or nickel oxides on a porous oxide support, such as alumina or silica-alumina, discloses a hydrodenitrification process employing a catalyst containing large concentrations of nickel and molybdenum on a predominantly alumina carrier to treat hydrocarbon streams boiling at 180° F. (82° C.) to about 1,050° F. (566° C.).

U.S. Pat. No. 2,843,552 discloses that a catalyst containing chromia in an appreciable amount with alumina provides a very good attrition resistant catalyst, can have molybdenum oxide impregnated thereon, and can be used in reforming, desulfurization, and isomerization processes.

U.S. Pat. No. 2,577,823 teaches that hydrodesulfurization of heavy hydrocarbon fractions containing from 1% to 6.5% sulfur in the form of organic sulfur compounds, such as a reduced crude, can be conducted over a catalyst of chromium, molybdenum, and aluminum oxides, which catalyst is prepared by simultaneously precipitating the oxides of chromium and molybdenum on a preformed alumina slurry at a pH of 6 to 8.

U.S. Pat. No. 3,265,615 discloses a method for preparing a supported catalyst in which a catalyst carrier of high surface area, such as alumina, is impregnated with ammonium molybdate and then immersed in an aqueous solution of chromic sulfate, and the treated carrier is dried overnight and subsequently reduced by treatment with hydrogen at the following sequential temperatures: 550° F. (288° C.) for ¼ hour; 750° F. (399° C.) for ¼ hour; and 950° F. (510° C.) for ¼ hour. The reduced material is sulfided and employed to hydrofine a heavy gas oil boiling from 650° F. (343° C.) to 930° F. (499° C.).

U.S. Pat. No. 3,956,105 discloses a process for hydrotreating petroleum hydrocarbon fractions, such as residual fuel oils, which process employs a catalyst comprising a Group VIB metal (chromium, molybdenum, tungsten), a Group VIII metal (nickel, cobalt) and a refractory inorganic oxide, which can be alumina, silica, zirconia, thoria, boria, chromia, magnesia, and composites thereof. The catalyst is prepared by dry mixing a finely divided Group VIB metal compound, a Group VIII metal compound, and a refractory inorganic oxide, peptizing the mixture and forming an extrudable dough, extruding, and calcining.

U.S. Pat. No. 3,640,817 discloses a two-stage process for treating asphaltene-containing hydrocarbons. Both catalysts in the process comprise one or more metallic components selected from the group consisting of molybdenum, tungsten, chromium, iron, cobalt, nickel, and the platinum group metals on a porous carrier material, such as alumina, silica, zirconia, magnesia, titania, and mixtures thereof, the first catalyst having more than 50% its macropore volume characterized by pores having a pore diameter that is greater than about 1,000 Å. (100 nm) and the second catalyst having less than 50% of its macropore volume characterized by pores having a pore diameter that is greater than about 1,000 Å. (100 nm).

U.S. Pat. No. 3,957,622 teaches a two-stage hydroconversion process for treating asphaltene-containing black oils. Desulfurization occurs in the first stage over a catalyst that has less than 50% of its macropore volume characterized by pores having a pore diameter greater than about 1,000 Å. (100 nm). Accelerated conversion and desulfurization of the asphaltenic portion occur in the second stage over a catalyst having more than 50% of its macropore volume characterized by pores having a pore diameter that is greater than 1,000 Å. (100 nm). Each catalyst comprises one or more metallic components selected from the group consisting of molybdenum, tungsten, chromium, iron, cobalt, nickel, the platinum group metals, and mixtures thereof on a support material of alumina, silica, zirconia, magnesia, titania, boria, strontia, hafnia, or mixtures thereof.

French Pat. No. 2,281,972 teaches the preparation of a catalyst comprising the oxides of cobalt, molybdenum, and/or nickel on a base of aluminum oxide and 3 to 15 wt.% chromium oxide and its use for the refining of hydrocarbon fractions, preferably for the hydrodesulfurization of fuel oils obtained by vacuum distillation or residual oils obtained by atmospheric distillation. The base can be prepared by coprecipitation of compounds of chromium and aluminum.

U.S. Pat. No. 3,162,596 teaches that, in an integrated process, a residual hydrocarbon oil containing metal contaminants (nickel and vanadium) is first hydrogenated either with a hydrogen donor diluent or over a catalyst having one or more hydrogenation promoting metals supported on a solid carrier exemplified by alumina or silica and then vacuum distilled to separate a heavy gas oil fraction containing reduced quantities of metals from an undistilled residue boiling primarily above about 1,100° F. (593° C.) and containing asphaltic material. The heavy gas oil fraction is subsequently catalytically cracked.

U.S. Pat. No. 3,180,820 discloses that a heavy hydrocarbon stock can be upgraded in a two-zone hydrodesulfurization process, wherein each zone employs a solid hydrogenation catalyst comprising one or more metals from Groups VB, VIB, and VIII of the Periodic Table of Elements. Either catalyst can be supported or unsupported. In a preferred embodiment, the first zone contains a supported catalyst in a fixed bed, slurry, or fluidized bed. The support of the supported catalyst is a porous refractory inorganic oxide carrier, including alumina, silica, zirconia, magnesia, titania, thoria, boria, strontia, hafnia, and complexes of two or more oxides, such as silica-alumina, silica-zirconia, silica-magnesia, alumina-titania, and silica-magnesia-zirconia, among others. The patent provides that the supported catalyst which is appropriate for use in the invention will have a surface area of about 50 m²/gm to 700 m²/gm, a pore diameter of about 20 Å. (2 mm) to 600 Å. (60 mm), and a pore volume of about 0.10 ml/gm to 20 ml/gm.

U.S. Pat. Nos. 3,977,961 and 3,985,684 disclose processes for the hydroconversion of heavy crudes and residua, which processes employ one or two catalysts, each of which comprises a Group VIB metal and/or a Group VIII metal on a refractory inorganic oxide, such as alumina, silica, zirconia, magnesia, boria, phosphate, titania, ceria, and thoria, can comprise a Group IVA metal, such as germanium, has a very high surface area and contains ultra-high pore volume. The first catalyst has at least about 20% of its total pore volume of absolute diameter within the range of about 100 Å. (10 mm) to about 200 Å. (20 mm), when the catalyst has a particle size diameter ranging up to 1/50 inch (0.051 cm), at least about 15% of its total pore volume of absolute diameter within the range of about 150 Å. (15 nm) to about 250 Å. (25 nm), when the catalyst has a particle size diameter ranging from about 1/50 inch (0.051 cm) to about 1/25 inch (0.102 cm), at least about 15% of its total pore volume of absolute diameter within the range of about 175 Å. (17.5 nm) to about 275 Å. (27.5 nm), when the catalyst has an average particle size diameter ranging from about 1/25 inch (0.102 cm) to about ⅛ inch (0.32 cm), a surface area of about 200 m²/gm to about 600 m²/gm, and a pore volume of about 0.8 cc/gm to about 3.0 cc/gm. The second catalyst has at least about 55% of its total pore volume of absolute diameter within the range of about 100 Å. (10 nm) to about 200 Å. (20 nm), less than 10% of its pore volume with pore diameters of 50 Å − (5 nm −), less than about 25% of its total pore volume with pore diameters of 300 Å + (30 nm +), a surface area of about 200 m²/gm to about 600 m²/gm, and a pore volume of about 0.6 cc/gm to about 1.5 cc/gm. These patents teach also that the effluent from such processes may be sent to a catalytic cracking unit or a hydrocracking unit.

U.S. Pat. No. 4,054,508 discloses a process for demetallization and desulfurization of residual oil fractions, which process utilizes 2 catalysts in 3 zones. The oil is contacted in the first zone with a major portion of a first catalyst comprising a Group VIB metal and an iron group metal oxide composited with an alumina support, the first catalyst having at least 60% of its pore volume in pores of 100 Å. (10 nm) to 200 Å. (20 nm) diameter and at least about 5% of its pore volume in pores having a diameter greater than 500 Å. (50 nm), in the second zone with the second catalyst comprising a Group VIB metal and an iron group metal oxide composited with an alumina support, the second catalyst having a surface area of at least 150 m²/gm and at least 50% of its pore volume in pores with diameters of 30 Å. (3 nm) to 100 Å. (10 nm), and then in a third zone with a minor portion of the first catalyst.

U.S. Pat. No. 3,168,461 teaches the hydrotreating of a heavy metal-containing hydrocarbon oil prior to charging such hydrocarbon oil, or a fraction thereof, to a fluid catalytic cracking operation. Furthermore, the cracking catalyst in the fluid catalytic cracking operation is subjected to a demetallization treatment. This patent states that in the hydrotreating operation hydrogenation catalysts generally known in the art can be employed and that such catalysts contain catalytically active amounts of a hydrogenation-promoting metal, such as metals having atomic numbers of about 23 to 28, the Group VIII catalysts of the platinum and iron groups, molybdenum, tungsten, and combinations thereof. It further discloses that the metals are frequently disposed as inorganic components, for instance, oxides, sulfides, or other compounds, supported on a solid carrier exemplified by alumina or silica. The demetallization of the cracking catalyst includes sulfiding, sulfating, and chlorination.

Now there has been found and developed a process for hydrotreating a heavy hydrocarbon stream containing metals, asphaltenes, nitrogen compounds, and sulfur compounds, which process comprises (1) hydrotreating the heavy hydrocarbon stream in the presence of a catalyst that has special physical characteristics and a hydrogenating component containing molybdenum and chromium, and optionally cobalt, to produce a hydrotreated effluent and (2) catalytically cracking at least a portion of the hydrotreated effluent.

SUMMARY OF THE INVENTION

Broadly, according to the present invention, there is provided a process for the cracking of a heavy hydrocarbon stream containing metals, asphaltenes, nitrogen compounds, and sulfur compounds, which process comprises: (1) contacting said stream in a hydrotreating zone under hydrotreating conditions and in the presence of hydrogen with a hydrotreating catalyst comprising a hydrogenating component comprising at least the hydrogenating metals molybdenum and chromium, said hydrogenating metals being present in the elemental form, as oxides, as sulfides, or mixtures thereof, deposed on a large-pore, catalytically active alumina to reduce the metals content in said stream, to convert the asphaltenes, nitrogen compounds, and sulphur compounds in said stream, and to provide a hydrotreated product stream, said hydrotreating catalyst possessing a pore volume within the range of about 0.4 cc/gm to about 0.8 cc/gm, a surface area within the range of about 150 m$^2$/gm to about 300 m$^2$/gm, and an average pore diameter within the range of about 100 Å (10 nm) to about 200 Å (20 nm); and (b) catalytically cracking at least a portion of said hydrotreated product stream in a catalytic cracking zone under catalytic cracking conditions and in the presence of a cracking catalyst to produce gasoline and distillates in improved yields.

The process can comprise a process wherein said hydrotreated product stream is blended with a gas oil to form a blend prior to being catalytically cracked in said catalytic cracking zone and said blend is catalytically cracked in said catalytic cracking zone.

The hydrogenating component of the hydrotreating catalyst can comprise further a small amount of the hydrogenating metal cobalt.

The hydrotreating catalyst that is employed in the process of the present invention can have about 0% to about 10% of its pore volume in pores having diameters that are smaller than 50 Å (5 nm), about 30% to about 80% of its pore volume in pores having diameters of about 50 Å (5 nm) to about 100 Å (10 nm), about 10% to about 50% of its pore volume in pores having diameters of about 100 Å (10 nm) to about 150 Å (15 nm), and about 0% to about 10% of its pore volume in pores having diameters that are larger than 150 Å (15 nm).

The process of the present invention comprises further contacting the heavy hydrocarbon stream in a demetallization zone under demetallization conditions and in the presence of hydrogen with a demetallization catalyst prior to contacting said stream in said hydrotreating zone with said hydrotreating catalyst.

BRIEF DESCRIPTION OF THE DRAWING

The accompanying FIGURE is a simplified flow diagram of a preferred embodiment of the process of the present invention.

DETAILED DESCRIPTION OF THE INVENTION

The present invention is directed to a novel process for the cracking of heavy hydrocarbon feedstocks. Such feedstocks will contain asphaltenes, metals, nitrogen compounds, and sulfur compounds. It is to be understood that the feedstocks that are to be treated by the process of the present invention will contain from a small amount of nickel and vanadium, e.g., less than 40 ppm, up to more than 1,000 ppm of nickel and vanadium (a combined total amount of nickel and vanadium) and up to about 25 wt.% asphaltenes. If the feedstock contains either a combined amount of nickel and vanadium that is too large or an amount of asphaltenes that is exceptionally large, the feedstock can be subjected to a preliminary treatment to reduce the excessive amount of the particular contaminant. Such preliminary treatment will comprise a suitable hydrogenation treatment for the removal of metals from the feedstock and/or the conversion of asphaltenes in the feedstock to reduce the contaminants to satisfactory levels, such treatment employing any suitable relatively cheap catalyst. The above-mentioned contaminants will deleteriously affect the subsequent processing of such feedstocks, if they are not lowered to acceptable levels.

Typical feedstocks that can be treated satisfactorily by the process of the present invention will often contain a substantial amount of components that boil appreciably above 1,000° F. (538° C.). Examples of typical feedstocks are crude oils, topped crude oils, petroleum hydrocarbon residua, both atmospheric and vacuum residua, oils obtained from tar sands and residua derived from tar sand oil, and hydrocarbon streams derived from coal. Such hydrocarbon streams contain organometallic contaminants which create deleterious effects in various refining processes that employ catalysts in the conversion of the particular hydrocarbon stream being treated. The metallic contaminants that are found in such feedstocks include, but are not limited to, iron, vanadium, and nickel.

Nickel is present in the form of soluble organometallic compounds in most crude oils and residuum fractions. The presence of nickel porphyrin complexes and other nickel organometallic completes causes severe difficulties in the refining and utilization of heavy hydrocarbon fractions, even if the concentration of such complexes is relatively small. It is known that a cracking catalyst deteriorates rapidly and its selectivity changes when in the presence of an appreciable quantity of the organometallic nickel compounds. An appreciable quantity of such organometallic nickel compounds in feedstocks that are being hydrotreated or hydrocracked harmfully affects such processes. The catalyst becomes deactivated and plugging or increasing of the pressure drop in a fixed-bed reactor results from the deposition of nickel compounds in the interstices between catalyst particles.

Iron-containing compounds and vanadium-containing compounds are present in practically all crude oils that are associated with the high Conradson carbon asphaltic and/or aslphaltenic portion of the crude. Of course, such metals are concentrated in the residual bottoms, when a crude is topped to remove those fractions that boil below about 450° F. (232° C.) to 600° F. (316° C.). If such residuum is treated by additional processes, the presence of such metals adversely affects the catalyst in such processes. It should be pointed out that nickel-containing compounds deleteriously affect cracking catalysts to a greater extent than do iron-containing compounds. If an oil containing such metals is used as a fuel, the metals will cause poor fuel oil performance in industrial furnaces, since they corrode the metal surfaces of the furnaces.

While metallic contaminants, such as vanadium, nickel, and iron, are often present in various hydrocarbon streams in rather small amounts, they are often found in concentrations in excess of 40 to 50 ppm by weight, often in excess of 1,000 ppm. Of course, other metals are also present in a particular hydrocarbon stream. Such metals exist as the oxides or sulfides of the particular metal, or they are present as a soluble salt of the particular metal, or they are present as high molecular weight organometallic compounds, including metal naphthenates and metal porphyrins, and derivatives thereof.

Broadly, according to the process of the present invention, there is provided a process for the cracking of a heavy hydrocarbon stream containing metals, asphaltenes, nitrogen compounds, and sulfur compounds, which process comprises: (a) contacting said stream in a hydrotreating zone under hydrotreating conditions and in the presence of hydrogen with a hydrotreating catalyst comprising a hydrogenating component comprising at least the hydrogenating metals molybdenum and chromium, said hydrogenating metals being present in the elemental form, as oxides, as sulfides, or mixtures thereof, deposed on a large-pore, catalytically active alumina to reduce the metals content in said stream, to convert the asphaltenes and sulphur compounds in said stream, and to provide a hydrotreated product stream, said hydrotreating catalyst possessing a pore volume within the range of about 0.4 cc/gm to about 0.8 cc/gm, a surface area within the range of about 150 m²/gm to about 300 m²/gm, and an average pore diameter within the range of about 100 Å (10 nm) to about 200 Å (20 nm); and (b) catalytically cracking at least a portion of said hydrotreated product stream in a catalytic cracking zone under catalytic cracking conditions and in the presence of a cracking catalyst to produce gasoline and distillates in improved yields.

It is to be understood that as used herein all values that are given for surface area would be those that are obtained by the BET nitrogen adsorption method; all values that are given for pore volume would be those that are obtained by nitrogen adsorption; and all values that are given for average pore diameter would be those that are calculated by means of the expression:

$$A.P.D. = 4 \times P.V. \times 10^4 / S.A.$$

wherein A.P.D. = average pore diameter in Å,
P.V. = pore volume in cc/gm, and
S.A. = surface area in m²/gm.

Furthermore, pore size distributions are those that are obtained by a Digisorb 2500 instrument through the use of nitrogen desorption techniques.

According to the invention, the process comprises a process wherein said portion of said hydrotreated product stream or said hydrotreated product stream is blended with a gas oil to form a blend prior to being catalytically cracked in said catalytic cracking zone and said blend is catalytically cracked in said catalytic cracking zone. Consequently, another embodiment of the process of the present invention is a process for cracking a heavy hydrocarbon stream containing metals, asphaltenes, nitrogen compounds, and sulfur compounds, which process comprises: (a) contacting said stream in a hydrotreating zone under hydrotreating conditions and in the presence of hydrogen with a hydrotreating catalyst comprising a hydrogenating component comprising at least the hydrogenating metals molybdenum and chromium, said hydrogenating metals being present in the elemental form, as oxides, as sulfides, or mixtures thereof, deposed on a large-pore, catalytically active alumina to reduce the metals content in said stream, to convert the asphaltenes, nitrogen compounds, and sulphur compounds in said stream, and to provide a hydrotreated product stream, said hydrotreating catalyst possessing a pore volume within the range of about 0.4 cc/gm to about 0.8 cc/gm, a surface area within the range of about 150 m²/gm to about 300 m²/gm, and an average pore diameter within the range of about 100 Å (10 nm) to about 200 Å (20 nm); (b) combining at least a portion of said hydrotreated product stream with a gas oil to form a blend; and (c) catalytically cracking said blend in a catalytic cracking zone under catalytic cracking conditions and in the presence of a cracking catalyst to produce gasoline and distillates in improved yields.

Moreover, the hydrogenating component of the hydrotreating catalyst can comprise further a small amount of cobalt. In such case, there is provided another embodiment of the process of the present invention, which embodiment comprises: (a) contacting a heavy hydrocarbon stream containing metals, asphaltenes, nitrogen compounds, and sulfur compounds in a hydrotreating zone under hydrotreating conditions and in the presence of hydrogen with a hydrotreating catalyst comprising a hydrogenating component comprising the hydrogenating metals molybdenum and chromium, and a small amount of the hydrogenating metal cobalt, said hydrogenating metals being present in the elemental form, as oxides, as sulfides, or mixtures thereof, deposed on a large-pore, catalytically active alumina to reduce the metals content in said stream, to convert the asphaltenes, nitrogen compounds, and sulphur compounds in said stream, and to provide a hydrotreated product stream, said hydrotreating catalyst possessing a pore volume within the range of about 0.4 cc/gm to about 0.8 cc/gm, a surface area within the range of about 150 m²/gm to about 300 m²/gm, and an average pore diameter within the range of about 100 Å (10 nm) to about 200 Å (20 nm); and (b) catalytically cracking at least a portion of said hydrotreated product stream in a catalytic cracking zone under catalytic cracking conditions and in the presence of a cracking catalyst to produce gasoline and distillates in improved yields.

In still another embodiment of the process, the process comprises: (a) contacting a heavy hydrocarbon stream containing metals, asphaltenes, nitrogen compounds, and sulfur compounds in a demetallization zone under demetallization conditions and in the presence of hydrogen with a demetallization catalyst to obtain a demetallized product stream, (b) contacting said demetallized product stream in a hydrotreating zone under hydrotreating conditions and in the presence of hydrogen with a hydrotreating catalyst comprising a hydrogenating component comprising at least the hydrogenating metals molybdenum and chromium, said hydrogenating metals being present in the elemental form, as oxides, as sulfides, or mixtures thereof, deposed on a large-pore, catalytically active alumina to reduce the metals content in said demetallized product stream, to convert the asphaltenes and sulphur compounds in said demetallized product stream, and to provide a hydrotreated product stream, said hydrotreating catalyst possessing a pore volume within the range of about 0.4 cc/gm to about 0.8 cc/gm, a surface area within the range of about 150 m²/gm to about 300 m²/gm, and an average pore diameter within the range of about 100 Å (10 nm) to about 200 Å (20 nm); and (c) catalytically cracking at least a portion of said hydrotreated product stream in a catalytic cracking zone under catalytic cracking conditions and in the presence of a cracking catalyst to produce gasoline and distillates in improved yields. Consequently, this embodiment of the process of the present invention is a process which comprises further contacting said heavy hydrocarbon stream in a demetallization zone under demetallization conditions and in the presence of hydrogen with a demetallization catalyst prior to contacting said stream in said hydrotreating zone with said hydrotreating catalyst.

Any typical demetallization catalyst can be employed in this embodiment of the process of the present invention. A typical demetallization catalyst comprises a hydrogenating component comprising a metal of Group VIB of the Periodic Table of Elements and/or a metal of Group VIII of the Periodic Table of Elements on a porous, refractory inorganic oxide, such as a large-pore alumina, silica, or mixtures thereof. Such catalyst will have a pore volume within the range of about 0.5 cc/gm to about 3.0 cc/gm, a surface area within the range of about 150 m$^2$/gm to about 500 m$^2$/gm, and an average pore diameter within the range of about 100 Å (10 nm) to about 200 Å (20 nm). The Periodic Table of Elements referred to herein is the Periodic Table found on page 628 of WEBSTER'S SEVENTH NEW COLLEGIATE DICTIONARY, G. & C. Merriam Company, Springfield, Mass., U.S.A. (1965).

Although the above embodiment of the process of the present invention wherein the heavy hydrocarbon stream is contacted with a demetallization catalyst prior to being contacted with the hydrotreating catalyst employs a hydrotreating catalyst that utilizes a hydrogenating component of at least the hydrogenating metals molybdenum and chromium, it is to be understood that in such an embodiment a hydrotreating catalyst having a hydrogenating component comprising further a small amount of cobalt is also available and can be used advantageously.

In the process of the present invention, the hydrotreating catalyst provides good metals removal, good desulfurization activity, good asphaltene conversion, and good conversion of the 1,000° F.+ (538° C.+) material to 1,000° F.− (538° C.−) material. The hydrogenating component of the hydrotreating catalyst comprises at least the hydrogenating metals molybdenum and chromium. The hydrogenating component can comprise in addition a small amount of cobalt. The metals are present in the elemental form, as oxides, as sulfides, or as mixtures of these. The molybdenum is present in an amount within the range of about 5 wt.% to about 15 wt.%, calculated as MoO$_3$ and based upon the total catalyst weight. The chromium is present in an amount within the range of about 5 wt.% to about 20 wt.%, calculated as Cr$_2$O$_3$ and based upon the total catalyst weight. When the hydrogenating component comprises also cobalt, the cobalt is present in an amount within the range of about 0.1 wt.% to about 5 wt.%, calculated as CoO and based upon the total catalyst weight. Preferably, the cobalt, if cobalt is employed, is present in an amount within the range of about 1 wt.% to about 3 wt.%, calculated as CoO and based upon the total catalyst weight; the molybdenum is present in an amount within the range of about 7 wt.% to about 13 wt.%, calculated as MoO$_3$ and based upon the total catalyst weight, and the chromium is present in an amount within the range of about 6 wt.% to about 15 wt.%, calculated as Cr$_2$O$_3$ and based upon the total catalyst weight.

Suitable catalytically active large-pore aluminas are employed in the catalyst that is utilized in the process of the present invention. A typical example of such an alumina is Aero-100 alumina, manufactured by the American Cyanamid Company. The alumina should have a pore volume that is in excess of 0.4 cc/mg, a surface area that is in excess of 150 m$^2$/gm, and an average pore diameter that is greater than 100 Å (10 nm).

Typically, the catalytic composition that is employed in the process of the present invention may be prepared by impregnating the various metals upon the suitable catalytically active large-pore alumina. Such impregnation may be accomplished with one or more solutions of heat-decomposable compounds of the appropriate metals. The impregnation may be a co-impregnation when a single solution of the metals is employed. Alternatively, impregnation may be accomplished by the sequential impregnation of the various metals from two or more solutions of the heat-decomposable compounds of the appropriate metals. The impregnated support is dried at a temperature of at least 250° F. (121° C.) for a period of at least 1 hour and calcined in air at a temperature of at least 1,000° F. (538° C.) for a period of time of at least 2 hours. Preferably, the catalyst that is used in the process of the present invention is prepared by first calcining pseudo-boehmite in static air at a temperature of about 800° F. (427° C.) to about 1,400° F. (760° C.) for a period of time within the range of about ½ hour to about 2 hours to produce a gamma-alumina. This gamma-alumina is subsequently impregnated with the aqueous solution or solutions containing the heat-decomposable salts of the molybdenum, chromium, and, if used, cobalt.

The finished catalyst that is employed in the process of the present invention possesses a pore volume within the range of about 0.4 cc/gm to about 0.8 cc/gm, a surface area within the range of about 150 m$^2$/gm to about 300 m$^2$/gm, and an average pore diameter within the range of about 100 Å (10 nm) to about 200 Å (20 nm). Preferably, the catalyst possesses a pore volume within the range of about 0.5 cc/gm to about 0.7 cc/gm, a surface area within the range of about 150 m$^2$/gm to about 250 m$^2$/gm, and an average pore diameter within the range of about 110 Å (11 nm) to about 150 Å (15 nm).

The catalyst employed in the process of the present invention should have about 0% to about 10% of its pore volume in pores having diameters that are smaller than 50 Å (5 nm), about 30% to about 80% of its pore volume in pores having diameters of about 50 Å (5 nm) to about 100 Å (10 nm) about 10% to about 50% of its pore volume in pores having diameters of about 100 Å (10 nm) to about 150 Å (15 nm), and about 0% to about 10% of its pore volume in pores having diameters that are larger than 150 Å (15 nm).

The process of the present invention is particularly useful for cracking heavy hydrocarbon streams such as petroleum residua, both atmospheric resids and vacuum resids, tar sands oils, tar sands resids, and liquids obtained from coal. If the amount of nickel and vanadium is excessive or the concentration of asphaltenes is too large, an embodiment of the process of the present invention employing a demetallization catalyst prior to the hydrotreating catalyst is preferably utilized. The demetallization catalyst reduces the excessive amount or amounts of the contaminants to more tolerable levels before the feedstock is contacted with the hydrotreating catalyst in the process of the present invention.

In the process of the present invention, operating conditions for the hydrotreatment of heavy hydrocarbon streams, such as petroleum hydrocarbon residua and the like, comprise a hydrogen partial pressure within the range of about 1,000 psia (6.9 MPa) to about 3,000 psia (20.7 MPa), an average catalyst bed temperature within the range of about 700° F. (371° C.) to about 820° F. (438° C.), a liquid hourly space velocity (LHSV) within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 standard cubic feet of hydrogen per barrel of hydrocarbon [SCFB] (356 m$^3$/m$^3$) to about 15,000 SCFB (2,672 m$^3$/m$^3$). Preferably, the operating conditions comprise a hydrogen partial pressure within the range of about 1,200 psia (8.3 MPa) to about 2,000 psia (13.8 MPa); an average catalyst bed temperature within the range of about 730° F. (388° C.) to about 810° F. (432° C.); an LHSV within the range of about 0.4 to about 1 volume of hydrocarbon per hour per volume of catalyst; and a hydrogen recycle rate or hydrogen addition rate within the range of about 5,000 SCFB (891 m$^3$/m$^3$) to about 10,000 SCFB (1,781 m$^3$/m$^3$).

The process of the present invention comprises catalytically cracking at least a portion of the first product stream. The catalytic cracking is suitably performed in a conventional or a resid catalytic cracking unit. A fluidized catalytic cracking unit is an example of such a unit, which comprises the catalytic cracking zone of the process of the present invention.

Any typical cracking catalyst may be employed in the catalytic cracking zone of the process of the present invention. Examples of cracking catalysts are a silica-magnesia composite and a silica-alumina composite, the latter composite containing anywhere from 10 wt.% to about 60 wt.% alumina. The catalyst may also comprise finely-divided crystalline aluminosilicate material suspended in a matrix of an amorphous material, such as a silica-alumina cracking catalyst. Both natural and synthetic crystalline aluminosilicate materials may be employed in such a catalyst. Typical examples are faujasite, X-type, and Y-type large-pore crystalline aluminosilicate materials. Such large-pore crystalline aluminosilicate materials have a pore diameter of about 8 Å (0.8 nm) to about 15 Å (1.5 nm). In some cases, the large-pore crystalline aluminosilicate materials have been cation-exchanged with one or more metals, such as one or more rare earth metals or polyvalent metals.

Catalytic cracking is ordinarily conducted at a temperature of about 750° F. (399° C.) to about 1,050° F. (566° C.), a pressure of about atmospheric to about 25 psig (172 kPa), and catalyst-to-oil ratios of about 3 to about 20. The catalyst may exist as a fluidized bed or a moving bed.

Coke is rapidly accumulated on a cracking catalyst during the cracking operation. Therefore, a portion of the catalyst is continuously withdrawn from the reaction zone and passed to a regeneration zone where the carbonaceous deposits on the catalyst are burned therefrom by contact with an oxygen-containing gas prior to the return of the catalyst to the cracking reaction zone. The regenerator is operated, in general, at a temperature of about 950° F. (510° C.) to about 1,500° F. (816° C.) and at a pressure of about atmospheric to about 35 psig (241 kPa). The oxygen-containing gas can be air or can be a mixture of an inert gas, such as flue gas or nitrogen, mixed with about 2 to about 5 volume percent of oxygen, based upon the total weight of the regeneration gas. Regenerated catalyst is continuously withdrawn from the regenerator and is returned to the reaction zone. A typical regeneration is maintained to provide a carbon content that is less than 0.5 wt.%, preferably, less than 0.1 wt.% carbon, based on the total weight of the catalyst.

A preferred embodiment of the process of the present invention is presented in the accompanying figure, which is a simplified flow diagram and does not show various pieces of auxiliary equipment, such as pumps, compressors, heat exchangers, and valves. Since one having ordinary skill in the art would recognize easily the need for and location of such auxiliary equipment, its omission is appropriate and facilitates the simplification of the figure. This process scheme is presented for the purpose of illustration only and is not intended to limit the scope of the present invention.

Referring to the figure, an Arabian light vacuum resid, containing about 4 wt.% sulfur, less than 0.5 wt.% nitrogen, and less than 100 ppm of nickel and vanadium, is withdrawn from source 10 through line 11 into pump 12, whereby it is pumped through line 13. A hydrogen-containing recycle gas stream, discussed hereinafter, is passed from line 14 into line 13 to be mixed with the hydrocarbon feed stream to form a mixed hydrogen-hydrocarbon stream. The mixed hydrogen-hydrocarbon stream is then passed from line 13 into furnace 15 where it is heated to a temperature within the range of about 760° F. (404° C.) to about 780° F. (416° C.). The heated stream is then passed through line 16 into reaction zone 17.

Reaction zone 17 comprises one or more reactors, each of which contains one or more fixed beds of catalyst. The catalyst comprises a hydrogenation component comprising 10 wt.% molybdenum, calculated as MoO$_3$ and based upon the total catalyst weight, and 10 wt.% chromium, calculated as Cr$_2$O$_3$ and based upon the total catalyst weight, on a large-pore, catalytically active alumina. The molybdenum and chromium are present either in the elemental form, as oxides of the metals, as sulfides of the metals, or as mixtures thereof. The catalyst has a pore volume within the range of about 0.4 cc/gm to about 0.8 cc/gm, a surface area within the range of about 150 m$^2$/gm to about 300 m$^2$/gm, an average pore diameter within the range of about 100 Å (10 nm) to about 200 Å (20 nm), and a pore-size distribution wherein about 0% to about 10% of the pore volume has pore diameters that are smaller than 50 Å (5 nm), about 30% to about 80% of the pore volume has pore diameters within the range of about 50 Å (5 nm) to about 100 Å (10 nm), about 10% to about 50% of the pore volume has pore diameters within the range of about 100 Å (10 nm) to about 150 Å (15 nm), and about 0% to about 10% of the pore volume has pore diameters that are larger than 150 Å (15 nm).

Optionally, the catalyst can have a hydrogenation component comprising further about 0.1 wt.% to about 5 wt.% cobalt, calculated as CoO and based upon the total catalyst weight, preferably about 1 wt.% to about 3 wt.% cobalt.

The operating conditions employed in this scheme comprise a hydrogen partial pressure of about 1,200 psia (8.3 MPa) to about 1,600 psia (11.0 MPa), an average catalyst bed temperature within the range of about 760° F. (404° C.) to about 780° F. (416° C.); an LHSV within the range of about 0.4 volume of hydrocarbon per hour per volume of catalyst to about 0.8 volume of hydrocarbon per hour per volume of catalyst; and a hydrogen recycle rate within the range of about 5,000 SCFB (891 m$^3$/m$^3$) to about 8,000 SCFB (1,425 m$^3$/m$^3$).

The effluent from reaction zone 17 is passed through line 18 into high-temperature, high-pressure, gas-liquid separator 19, which is operated at reactor pressure and a temperature within the range of about 760° F. (404° C.) to about 780° F. (416° C.). In separator 19, hydrogen-containing gas is separated from the liquid effluent. The hydrogen-containing gas is passed from separator 19 through line 20. It is cooled and passed into light-hydrocarbon separator 21, wherein the light hydrocarbons are separated from the hydrogen-containing gas and withdrawn through line 22. The hydrogen-containing gas is passed into scrubber 24, wherein the hydrogen sulfide is removed or scrubbed from the gas. The hydrogen sulfide is removed from the system by way of line 25. The scrubbed hydrogen-containing gas is then passed through line 14, where it can be joined by make-up hydrogen, if necessary, via line 26. The hydrogen-containing gas stream is then added to the hydrocarbon feed stream in line 13, as described hereinabove.

The liquid portion of the effluent is passed from the high-temperature, high-pressure, gas-liquid separator 19 by way of line 27 to high-temperature flash drum 28. In flash drum 28, the pressure is reduced to atmospheric pressure and the temperature of the material is within the range of about 700° F. (371° C.) to about 800° F. (427° C.). In flash drum 28, the light hydrocarbons containing not only the naphtha but those distillates boiling up to a temperature of about 550° F. (288° C.) to 600° F. (316° C.), such as fuel oils, is flashed from the rest of the product and is removed from the system by way of line 29. Such light hydrocarbons, which comprise about 1 wt.% to about 4 wt.% $C_4$-material, about 2 wt.% to 5 wt.% naphtha [$C_5$-to-360° F. ($C_5$-to-182° C.) material], and about 10 wt.% to about 15 wt.% 360° F.–650° F. (182° C.–343° C.) material, based upon hydrocarbon feed, can be separated into their various components and sent to storage or to other processing units.

The heavier material that is separated from the light hydrocarbons, that is, material that boils at a temperature above about 600° F. (316° C.), present in an amount of about 60 wt.% to about 90 wt.% based upon the hydrocarbon feed, is removed from flash drum 25 by way of line 30. At least a portion of this heavier material is used as a feedstock for a fluid catalytic cracking unit and is identified hereinafter as catalytic cracker feed. Such liquid material contains about 0.6 1 wt.% to about 1.2 wt.% sulfur, about 1.0 wt.% to about 3.0 wt.% asphaltenes, and about 5 ppm to about 15 ppm nickel and vanadium. Furthermore, more than 50% of the 1,000° F.+ (538° C.+) material is converted to 1,000° F.– (538° C.–) material.

The catalytic cracker feed is passed from line 30 through line 31. In line 31, it is admixed with gas oil obtained from the crude from which the Arabian light vacuum resid in source 10 is obtained. The gas oil is introduced into line 31 by way of line 32. The resulting blend, approximately 70% gas oil and 30% hydrotreated product, is passsed by line 31 into catalytic cracking zone 33, which comprises a conventional fluidized catalytic cracking unit. The following useful products are withdrawn from catalytic cracking zone 30: 50 vol.% to 70 vol.% gasoline-boiling-range material via line 34; 20 vol.% to 40 vol.% distillates via line 35; and 0 vol.% to 20 vol.% heavy distillates via line 36.

The following examples are presented to facilitate the understanding of the present invention and are presented for the purposes of illustration only and are not intended to limit the scope of the present invention.

EXAMPLE 1

Two catalysts were employed in the tests discussed hereinafter in Examples 2, 3 and 4.

The first of these two catalysts, hereinafter identified as Catalyst A, is a proprietary catalyst comprising approximately 1 wt.% NiO on a large-pore refractory oxide and having a pore volume of 0.99 cc/gm, a surface area of 243 m²/gm, and an average pore diameter of 162 Å (16.2 nm). This catalyst was used as a demetallization catalyst.

The second catalyst, identified hereinafter as Catalyst B, was prepared to contain 1.1 wt.% CoO, 8.2 wt.% $MoO_3$, and 8.2 wt.% $Cr_2O_3$, based upon the total catalyst weight, on a large-pore, catalytically active alumina. A 63.8-gram sample of Aero-100 alumina, obtained from the American Cyanamid Company, was impregnated with a solution containing ammonium dichromate and ammonium molybdate. The Aero-100 alumina was in the form of 14-to20-mesh (1.17-to-0.83 mm) material and had been previously calcined at a temperature of about 1,200° F. (649° C.) in air for a period of 2 hours.

The solution that was used for the impregnation was prepared by dissolving 10.6 grams of ammonium dichromate and 8.3 grams of ammonium molybdate in 80 milliliters of distilled water. The alumina to be impregnated was added to the solution and the resulting mixture was allowed to stand overnight.

The impregnated alumina was dried subsequently under a heat lamp in static air overnight to remove the excess water. The dried material was then calcined in static air at a temperature of 1,000° F. (538° C.) for a period of 2 hours.

One-half of the calcined material was impregnated with a solution of cobalt nitrate. This solution was prepared by dissolving 1.2 grams of $Co(NO_3)_2.6 H_2O$ in 40 milliliters of distilled water. The mixture of calcined material and solution was allowed to stand overnight.

The material was then dried under a heat lamp in static air for a period of about 2 hours. The dried material was calcined in static air at a temperature of 1,000° F. (538° C.) for a period of 2 hours. The finished catalyst, Catalyst B, is a preferred embodiment of the catalyst that is employed in the process of the present invention. Its properties are listed hereinbelow in Table I.

TABLE I

| CATALYST PROPERTIES | |
|---|---|
| CATALYST | B |
| HYDROGENATION COMPONENT, WT. % | |
| CoO | 1.1 |
| $Cr_2O_3$ | 8.2 |
| $MoO_3$ | 8.2 |
| PHYSICAL PROPERTIES | |
| SURFACE AREA, m²/gm | 176 |
| PORE VOLUME, cc/gm | 0.55 |
| AVG. PORE DIAM., Å | 125 |
| nm | 12.5 |
| % OF PORE VOLUME IN: | |
| 0–50 Å (0–5 nm) PORES | 3.9 |
| 50–100 Å (5–10 nm) PORES | 66.3 |
| 100–150 Å (10–15 nm) PORES | 28.9 |
| 150–200 Å (15–20 nm) PORES | 0.3 |
| 200–300 Å (20–30 nm) PORES | 0.3 |
| 300–400 Å (30–40 nm) PORES | 0.1 |
| 400–600 Å (40–60 nm) PORES | 0.2 |
| Bulk Density, gm/cc | 0.83 |

EXAMPLE 2

Catalysts A and B were employed to treat a Gach Saran atmospheric resid, identified hereinafter as Feedstock A, the properties of which are presented hereinbelow in Table II. This test is identified hereinafter as Test No. 1.

TABLE II
FEED PROPERTIES

| Feedstock | A | B | C |
|---|---|---|---|
| Carbon, wt. % | 85.48 | 84.91 | 82.16 |
| Hydrogen, wt. % | 11.44 | 10.61 | 9.50 |
| H/C (atomic) | | 1.499 | |
| Nitrogen, wt. % | 0.46 | 0.34 | 0.70 |
| Sulfur, wt. % | 2.41 | 4.07 | 6.91 |
| Nickel, ppm | 60 | 17.5 | 152 |
| Vanadium | 159 | 51.1 | 407 |
| 1,000° F.-(538° C.-)fraction | | 13.6 | 0 |
| Ramsbottom carbon, wt. % | | 15.2 | 20.0 |
| Gravity, °API | 17.0 | 8.8 | 1.5 |
| Asphaltenes, wt. % | | 8.0 | 19.0 |
| Oils, wt. % | | 39.2 | |
| Resins, wt. % | | 52.8 | |
| Resins/asphaltenes | | 6.6 | |
| Carbon Residue | 9.0 | | |
| Pour Point | +80° F. (+27° C.) | | |
| Viscosity, Cs | | | |
| at 150° C. | 133.2 | | |
| at 210° C. | 32.1 | | |

Test No. 1 was carried out in a bench-scale test unit having automatic controls for pressure, flow of reactants, and temperature. The reactor was made from ⅜-inch(0.95-cm)-inside-diameter stainless-steel, heavy-walled tubing. A ⅛-inch(0.32-cm)-outside-diameter thermo-well extended up through the center of the reactor. The reactor was heated by an electrically-heated steel block. The hydrocarbon feedstock was fed to the unit by means of a Ruska pump, a positive-displacement pump.

The catalysts were charged to the reactor as follows: A 10-inch (25.4-cm) layer of 8-to-10-mesh (2.38–2.00 mm) alundum particles were first introduced into the reactor. Upon this layer of support, were placed 9.5 gm (11.5 cc) of Catalyst B and upon Catalyst B were placed 4.0 gm (11.5 cc) of Catalyst A. These two beds of catalyst occupied 12 inches (30.5 cm) of reactor length. Upon the bed of Catalyst A was placed a 6-in (15.2-cm) layer of 8-to-10-mesh (2.38–2.00 mm) alundum particles. The catalyst was located in the annular space between the thermowell and the internal wall of the ⅜-inch(0.95-cm)-inside-diameter reactor.

Prior to their use, the catalysts were calcined in still air at a temperature of about 1,000° F. (538° C.) for 1 hour. They were subsequently cooled in a desiccator and loaded into the appropriate reactor.

The catalysts were then subjected to the following pretreatment. The reactor was placed in the reactor block at a temperature of 300° F. (149° C.). A gas mixture containing 8 mole % hydrogen sulfide in hydrogen was passed over the catalyst at the rate of 1 standard cubic foot per hour [SCFH] (28.3 l/hr) at a pressure of 500 psig (3.5 MPa) and a temperature of about 300° F. (149° C.). After 10 to 15 minutes of such treatment, the temperature of the block was raised to 400° F. (204° C.). After at least an additional 1 hour of time had elapsed and at least 1 standard cubic foot (28.3 l) of gas mixture had passed through the system, the temperature of the block was raised to 700° F. (371° C.). Then the gas mixture was passed through the catalyst bed for at least 1 additional hour and in an amount of at least 1 standard cubic foot (28.3 l). At this point, the gas mixture was discontinued, hydrogen was introduced into the unit at a pressure of 1,200 psig (8.4 MPa), the flow of hydrogen was established at a rate of about 0.6 SCFH (17 l/hr), and the temperature was increased to provide an average catalyst bed temperature of 760° F. (404° C.). Subsequently, the hydrocarbon flow was established at a rate that would provide an LHSV of 0.4 volume of hydrocarbon per hour per volume of catalyst. Effluent from the reaction zone was collected in a liquid product receiver, while the hydrogen and gas that was formd were passed through a pressure control valve and then through a wet test meter to an appropriate vent.

After a period of 2 days, the average catalyst bed temperature was increased to 780° F. (416° C.).

After the test was lined out at a given set of conditions, a material balance was made over a 16-to-18-hour period. Light hydrocarbons were separated from the off gas by a series of cold traps during the material balance period. At the end of the period, the trapped light hydrocarbons were expanded and measured volumetrically and analyzed by gas chromatography. Liquid products were weighed and analyzed for carbon, hydrogen, sulfur, nitrogen, nickel, vanadium, carbon residue and boiling point distribution. Hydrogen consumptions were calculated based on a feed and product carbon balance.

In this Test No. 1 the feed rate was 9.3 cc/hr, which rate gives for each catalyst an LHSV of 0.8 volume of hydrocarbon per hour per volume of catalyst and an overall LSHV of 0.4 volume of hydrocarbon per hour per volume of catalyst. The reactor was operated isothermally with both catalyst beds at an average catalyst bed temperature of 780° F. (416° C.). Total hydrogen pressure was maintained at 1,200 psig (8.3 MPa) with a hydrogen flow rate of about 8,000 SCFB (1,425 m³/m³ of oil).

The properties of product obtained during the fifth day on oil are presented in Table III hereinbelow.

The quality of the product is such that the 600° F.+(316° C.+) fraction could be used as a feed for catalytic cracking.

TABLE III
PRODUCT PROPERTIES

| Test No. | 1 |
|---|---|
| Gravity, °API | 25.3 |
| Density at 15° C., gm/cc | 0.9019 |
| Carbon, wt. % | 86.87 |
| Hydrogen, wt. % | 12.13 |
| Sulfur, wt. % | 0.43 |
| Nitrogen, wt. % | |
| Carbon residue, wt. % | 3.46 |
| Nickel, ppm | 7 |
| Vanadium, ppm | 2 |
| C₄-Yield, wt. % | 2.07 |
| Simulated Distillation of Liquid Product | |
| IBP-360° F. (IBP-182° C.), wt. % | 5.0 |
| 360°-650° F. (182°-343° C.), wt. % | 24.0 |
| 650°-1,000° F. (343°-538° C.), wt. % | 49.5 |
| 1,000° F. + (538° C.+), wt. % | 21.5 |
| Hydrogen Consumption, SCFB | |
| To liquid | 320 |
| To C₁—C₄ | 123 |
| To H₂S and NH₃ | 83 |
| Total | 526 |
| Hydrogen Consumption, m³/m³ | |
| To liquid | 57 |
| To C₁—C₄ | 22 |

TABLE III-continued

| PRODUCT PROPERTIES | |
|---|---|
| To H$_2$S and NH$_3$ | 15 |
| Total | 94 |
| Recovery, wt. % | 101.3 | boiling range and carbon residue. The coke make on the cracking catalyst might increase as much as 2 wt.%; however, with modifications to increase coke burning capacity, it would be possible to utilize the hydrotreated vacuum resid as feed to a catalytic cracker designed to handle gas oils.

TABLE IV

| | Total Liquid Product Properties | | | | | |
|---|---|---|---|---|---|---|
| Test No. | — | 2 | — | 2 | 3 | 3 |
| Liquid | Light Arabian Vacuum Resid | Hydrotreated Product (P) | Light Arabian Gas Oil (GO) | Blend of P + GO | Hydrotreated Product (P$_1$) | Blend of P$_1$ + GO |
| Asphaltenes, wt. % | 8.0 | 1.7 | 0.0 | 0.5 | 0.9 | 0.25 |
| 1,000° F. − (538° C.−), wt. % | 13.6 | 70.2 | 88.5 | 83.4 | 63.8 | 81.6 |
| 1,000° F. + (538° C.+) conversion, wt. % | — | 65.5 | — | | | |
| Ramsbottom carbon, wt. % | 15.2 | 8.4 | 0.38 | 2.6 | 5.6 | 1.8 |
| Ni, ppm | 17.5 | 3.6 | 1 | 1.8 | 2.5 | 1.4 |
| V, ppm | 51.1 | 3.6 | 1 | 1.8 | 0.8 | 0.9 |
| Sulfur, wt. % | 4.1 | 0.76 | 2.5 | 2.1 | 0.32 | 1.9 |
| Nitrogen, wt. % | 0.34 | 0.2 | 0.07 | 0.11 | 0.2 | 0.11 |
| Gravity, °API | 8.8 | 20.9 | 23.2 | 22.5 | 22.0 | 22.6 |
| Density at 15° C., gm/cc | 1.0080 | 0.9280 | 0.9142 | 0.9183 | 0.9213 | 0.9177 |

EXAMPLE 3

Catalyst B was employed to treat a Light Arabian Vacuum Resid, identified hereinafter as Feedstock B, the properties of which are presented hereinabove in Table II. This test is identified hereinafter as Test No. 2.

Test No. 2 was carried out in a unit similar to the one described in Example 2 hereinabove. The reactor was charged as follows: A 10-inch (25.4-cm) layer of 8-to-10-mesh (2.38-to-2.00 mm) alundum particles was placed in the reactor. Then 14.9 gm of Catalyst B [11 inches (27.9 cm)] were placed on top of the alundum particles. The catalyst was in the form of 14-to-20-mesh (1.17-to-0.83 mm) particles. Above the catalyst was a 7-inch (17.8-cm) layer of 8-to-10-mesh (2.38-to-2.00 mm) alundum particles.

Test No. 2 was started up in a manner similar to that utilized in Example 2. The test was carried out at a pressure of 1,200 psig (8.4 MPa), an average catalyst bed temperature of 800° F. (427° C.), and an LHSV of 0.59 volume of hydrocarbon per hour per volume of catalyst.

The first 3 days on stream, the average catalyst bed temperature was about 760° F. (404° C.). Then this average catalyst bed temperature was increased to 780° F. (416° C.) and this latter temperature was maintained through the 7th day on oil. Then the temperature was raised to 800° F. (427° C.) and was maintained at this level. A product sample was obtained during the 9th day on oil. The results of tests performed on this product sample are presented in Table IV hereinbelow. Also provided in Table IV are data for a blend of that product sample (28%) and light Arabian gas oil (72%). This gas oil was obtained from the crude from which the Arabian light vacuum resid was derived. The blend was in the ratio of resid to gas oil found in Arabian light crude.

The data in Table IV show that the hydrotreated product and the blend of hydrotreated product and virgin gas oil are of sufficient quality to be used as feeds for catalytic cracking. The sulfur content of the blend is lower than that of the virgin gas oil, but the nitrogen content increased. The increased asphaltene content and small change in API gravity would have only minor effects on cracking quality. The blend has higher

EXAMPLE 4

A second test directed to the hydrotreating of Feedstock B in the presence of Catalyst B was carried out; however, the pressure in this second test was 1,600 psig (11.1 MPa) and the LHSV was varied between 0.25 and 0.50 volume of hydrocarbon per hour per volume of catalyst. This test is identified hereinafter as Test No. 3.

The bench-scale test unit of Test No. 3 was similar to that described in Example 2; however, two reactors of the size utilized in Examples 2 and 3 were employed in series in this test. In the first reactor, 14.8 gm of catalyst (20 cc), as 14-to-20-mesh (1.17-to-0.83 mm) material, were placed on a 10-inch (25.4-cm) layer of 8-to-10-mesh (2.38-to-2.00 mm) alundum particles and an 8-inch (20.8-cm) layer of 8-to-10-mesh (2.38-to-2.00 mm) alundum particles was placed over the catalyst. In the second reactor, 14.9 gm of catalyst (20 cc), as 14-to-20-mesh (1.17-to-0.83 mm) material, were placed on a 10-inch (25.4-cm) layer of 8-to-10-mesh (2.38-to-2.00 mm) alundum particles and an 8-inch (20.3-cm) layer of 8-to-10-mesh (2.38-to-2.00 mm) alundum particles was placed over the catalyst. In each reactor the catalyst bed was approximately 10 inches (25.4 cm) in length.

The catalyst pretreatment and the startup of the test were similar to those employed in Examples 2 and 3; however, a test pressure of 1,600 psig (11.1 MPa) was used. The run was started at an average catalyst bed temperature of 760° F. (404° C.), an LHSV of 0.50 volume of hydrocarbon per hour per volume of catalyst, and a total pressure of 1,600 psig (11.1 MPa). After 2 days, the temperature was increased to 780° F. (416° C.). This latter temperature and 1,600 psig (11.1 MPa) pressure were then maintained throughout the run. The LHSV was charged to 0.25 volume of hydrocarbon per hour per volume of catalyst after 7 days on oil and then back to 0.50 volume of hydrocarbon per hour per volume of catalyst after 29 days on oil. At 34 days on oil the feed was changed to a demetallized tar sands vacuum resid, hereinafter identified as Feedstock C. Properties of Feedstock C are presented in Table II hereinabove. At 45 days on oil, Feedstock C was stopped and Feedstock B was used again. Several mass balances were made during this test and data obtained from these mass balances are presented hereinbelow in Table V. A summary of data obtained during Test No. 3 is presented in Table VI hereinbelow. In addition, data obtained from hydrotreated product taken from this Test No. 3 and from a blend of light Arabian gas oil (72%) and such hydrotreated product (28%) are presented hereinabove in Table IV.

In this Test No. 3, at 7 days on oil, 1,000° F.+ (538° C.+) conversion was 42%, asphaltene conversion was 80%, desulfurization was 90%, and nickel and vanadium removal were 80% and 91%, respectively. At 27 days on oil and a decrease in LHSV and an increase in gas rate, the heavy material conversion increased to 53%, while the asphaltene conversion and desulfurization were lined out at 83% and 93%, respectively. At 29 days on oil, the LHSV was increased to 0.50 volume of hydrocarbon per hour per volume of catalyst and the heavy material conversion was 41%, the asphaltene conversion was 79%, and the desulfurization was 81%. Hence, the values obtained for heavy material conversion and asphaltene conversion obtained after 29 days on oil were similar to those obtained at 7 days on oil. At 38 days on oil and the change to Feedstock C, heavy material conversion was 35%, asphaltene conversion was 80%, desulfurization was 83%, nickel removal was 74%, and vanadium removal was 97%. At 45 days on oil, Feedstock B was employed again for an additional 5 days on oil. The sulfur and gravity values were found to be slightly poorer than the values obtained before using the higher-metal-containing feed, Feedstock C. However, the asphaltene content had increased from about 1.65% to about 2.3%, that is, asphaltene conversion had decreased from about 79% to about 71%.

The used catalyst at the end of Test No. 3 was found to contain 17.3 wt.% carbon.

TABLE V

Test No. 3 - Mass Balances and Hydrogen Consumptions Catalyst B was used.

| Days on Oil | 7 | 14 | 38 |
|---|---|---|---|
| Feedstock | B | B | C |
| Avg. Cat. Bed Temperature, °F. | 780 | 780 | 780 |
| °C. | 416 | 416 | 416 |
| Pressure, psig | 1,600 | 1,600 | 1,600 |
| MPa | 11.1 | 11.1 | 11.1 |
| LHSV | 0.50 | 0.25 | 0.50 |
| Gas rate, SCFB | 5,700 | 10,400 | 8,100 |
| $m^3/m^3$ | 1,015 | 1,852 | 1,443 |
| Liquid Feed, gm | 264.9 | 177.1 | 163.5 |
| Hydrogen used, gm | 2.7 | 1.9 | 1.5 |
| Total feed, gm | 267.6 | 179.0 | 165.0 |
| Liquid product, gm | 252.6 | 167.5 | 159.6 |
| Gaseous hydrocarbons, gm | 0.4 | 0.2 | 0.5 |
| $NH_3 + H_2S$, gm | 10.7 | 7.7 | 3.6 |
| Total product, gm | 263.7 | 175.4 | 163.7 |
| Wt. Balance, % loss or gain | −1.5 | −2.0 | −0.8 |
| Liquid Product | | | |
| % C | 87.53 | 87.54 | 86.84 |
| % H | 11.68 | 11.70 | 11.41 |
| % N | 0.23 | 0.20 | 0.45 |
| % S | 0.45 | 0.24 | 0.46 |
| Total, % | 99.89 | 99.68 | 99.16 |
| Product Distribution[1], wt. % | | | |
| $H_2S + NH_3$ | 4.05 | 4.37 | 2.20 |
| $C_1-C_4$ | 0.41 | 0.67 | 0.47 |
| IBP-450° F. (IBP-232° C.), liquid | 5.74 | 7.03 | 10.80 |
| 450°–650° F. (232° C.–343° C.), liquid | 8.31 | 20.14 | 17.81 |
| 650°–1,000° F. (343° C.–538° C.), liquid | 33.21 | 34.94 | 40.88 |
| 1,000° F. + (538° C. +), liquid | 48.25 | 32.85 | 27.84 |
| Hydrogen Consumption, SCFB | | | |
| Liquid product | 478 | 490 | 467 |
| Gaseous hydrocarbons | 22 | 36 | 22 |
| $H_2S$ | 151 | 160 | 80 |
| $NH_3$ | 13 | 16 | 25 |
| Total | 664 | 702 | 594 |
| Hydrogen Consumption, $m^3/m^3$ | | | |
| Liquid product | 85 | 87.3 | 83.2 |
| Gaseous hydrocarbons | 3.9 | 6.4 | 3.9 |
| $H_2S$ | 26.9 | 28.5 | 14.3 |
| $NH_3$ | 2.3 | 2.9 | 4.5 |
| Total | 118.3 | 125.0 | 105.9 |

[1]All normalized to 100% weight balance.

TABLE VI

Additional Data Obtained from Test No. 3

| Days on Oil | 2 | 5 | 7 | 14 | 27 | 29 | 38 | 44 | 45 | 47 | 49 |
|---|---|---|---|---|---|---|---|---|---|---|---|
| Feedstock | B | B | B | B | B | B | C | C | B | B | B |
| Hydrogen, SCFB | 5,700 | 5,700 | 5,700 | 10,400 | 10,400 | 8,100 | 8,100 | 8,100 | 8,100 | 8,100 | 8,100 |
| LHSV | 0.50 | 0.50 | 0.50 | 0.25 | 0.25 | 0.50 | 0.50 | 0.50 | 0.50 | 0.50 | 0.50 |
| Temperature, °F. | | | | | | | | | | | |
| Reactor No. 1 | 760 | 781 | 780 | 780 | 780 | 780 | 780 | 780 | — | 780 | 780 |
| Temperature, °C. | | | | | | | | | | | |
| Reactor No. 1 | 404 | 416 | 416 | 416 | 416 | 416 | 416 | 416 | — | 416 | 416 |
| Reactor No. 2 | 404 | 416 | 416 | 416 | 416 | — | — | — | — | — | — |
| Sulfur, wt. % | 0.40 | 0.39 | 0.45 | 0.24 | 0.30 | 0.72 | 0.38 | 0.38 | 0.90 | 0.92 | 0.92 |
| Gravity, °API | 20.1 | 20.5 | 20.5 | 21.6 | 21.6 | 19.9 | 20.9 | 20.9 | 18.2 | — | 18.6 |
| Density, 15° C., gm/cc | 0.9308 | 0.9304 | 0.9304 | 0.9237 | 0.9237 | 0.9341 | 0.9280 | 0.9280 | 0.9447 | — | 0.9422 |
| 1,000° F. − (538° C.−), wt. % | 44.4 | 54.0 | 49.5 | 65.4 | 59.2 | 48.8 | 71.4 | | | | |
| 1,000° F. + (538° C.+) Conv., wt. % | 35.6 | 46.8 | 41.7 | 60.0 | 52.8 | 40.7 | 66.9 | | | | |
| Ni, ppm | | 3.1 | 3.5 | 0.90 | 2.9 | | 15.1 | | | | |
| V, ppm | | 4.4 | 4.6 | 1.9 | 0.75 | | 2.5 | | | | |
| Asphaltenes, wt. % | 1.10 | 1.50 | 1.60 | 1.10 | 1.37 | 1.69 | 1.28 | 1.40 | 2.10 | 2.25 | 2.32 |
| Ramsbottom Carbon, wt. % | | | 6.43 | 5.6 | | | 6.6 | | | | |
| C, wt. % | | | 87.53 | 87.54 | | | 86.84 | | | | |
| H, wt. % | | | 11.68 | 11.70 | | | 11.40 | | | | |
| H/C, wt. % | | | 1.60 | 1.60 | | | 1.58 | | | | |
| N, wt. % | | | | | | | 0.45 | | | | |

Table V shows that for Test No. 3, hydrogen consumptions are low. The Feedstock C, the demetallized tar sands feed, consumed approximately 70 SCFB (12.5 $m^3/m^3$) less hydrogen.

Again the data from Test No. 3 presented in Table IV demonstrate that the blend of hydrotreated material and virgin gas oil is suitable for use as a catalytic cracking feed. Of course, the data in Table VI show that the hydrotreated product can be sent advantageously to a catalytic cracker.

What is claimed is:

1. A process for hydrotreating and cracking a heavy hydrocarbon stream containing metals, asphaltenes, nitrogen compounds, and sulfur compounds, which process comprises: (a) contacting said stream in a hydrotreating zone under hydrotreating conditions and in the presence of hydrogen with a hydrotreating catalyst comprising molybdenum and chromium, said molybdenum and chromium being present in the elemental form, as oxides, as sulfides, or mixtures thereof, deposed on a large-pore, catalytically active alumina to reduce the metals content in said stream, to convert the asphaltenes, nitrogen compounds, and sulphur compounds in said stream, and to provide a hydrotreated product stream, said hydrotreating catalyst possessing a pore volume within the range of about 0.4 cc/gm to about 0.8 cc/gm, a surface area within the range of about 150 m$^2$/gm to about 300 m$^2$/gm, and an average pore diameter within the range of about 100 Å (10 nm) to about 200 Å (20 nm); and (b) catalytically cracking at least a portion of said hydrotreated product stream in a catalytic cracking zone under catalytic cracking conditions and in the presence of a cracking catalyst to produce gasoline and distillates in improved yields.

2. The process of claim 1, wherein said portion of said hydrotreated product stream is blended with a gas oil to form a blend prior to being catalytically cracked in said catalytic cracking zone.

3. The process of claim 1, wherein said molybdenum is present in an amount within the range of about 5 wt.% to about 15 wt.%, calculated as MoO$_3$ and based upon the total hydrotreating catalyst weight, and said chromium is present in an amount within the range of about 5 wt.% to about 20 wt.%, calculated as Cr$_2$O$_3$ and based upon the total hydrotreating catalyst weight.

4. The process of claim 1, wherein said hydrotreating catalyst has about 0% to about 10% of its pore volume in pores having diameters that are smaller than 50 Å (5 nm), about 30% to about 80% of its pore volume in pores having diameters of about 50 Å (5 nm) to about 100 Å (10 nm), about 10% to about 50% of its pore volume in pores having diameters of about 100 Å (10 nm) to about 150 Å (15 nm), and about 0% to about 10% of its pore volume in pores having diameters that are larger than 150 Å (15 nm).

5. The process of claim 1, wherein said hydrotreating catalyst includes cobalt.

6. The process of claim 1, which process includes contacting said stream in a demetallization zone under demetallization conditions and in the presence of hydrogen with a demetallization catalyst prior to contacting said stream in said hydrotreating zone with said hydrotreating catalyst.

7. The process of claim 1, wherein said hydrotreating conditions comprise a hydrogen partial pressure within the range of about 1,000 psia (6.9 MPa) to about 3,000 psia (20.7 MPa), an average catalyst bed temperature within the range of about 700° F. (371° C.) to about 820° F. (438° C.), an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB (356 m$^3$/m$^3$) to about 15,000 SCFB (2,672 m$^3$/m$^3$).

8. The process of claim 2, wherein said hydrotreating conditions comprise a hydrogen partial pressure within the range of about 1,000 psia (6.9 MPa) to about 3,000 psia (20.7 MPa), an average catalyst bed temperature within the range of about 700° F. (371° C.) to about 820° F. (438° C.), an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB (356 m$^3$/m$^3$) to about 15,000 SCFB (2,672 m$^3$/m$^3$).

9. The process of claim 3, wherein said portion of said hydrotreated product stream is blended with a gas oil to form a blend prior to being catalytically cracked in said catalytic cracking zone.

10. The process of claim 3, which process includes contacting said stream in a demetallization zone under demetallization conditions and in the presence of hydrogen with a demetallization catalyst prior to contacting said stream in said hydrotreating zone with said hydrotreating catalyst.

11. The process of claim 3, wherein said hydrotreating conditions comprise a hydrogen partial pressure within the range of about 1,000 psia (6.9 MPa) to about 3,000 psia (20.7 MPa), an average catalyst bed temperature within the range of about 700° F. (371° C.) to about 820° F. (438° C.), a LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB (356 m$^3$/m$^3$) to about 15,000 SCFB (2,672 m$^3$/m$^3$).

12. The process of claim 4, wherein said molybdenum is present in an amount within the range of about 5 wt.% to about 15 wt.% calculated as MoO$_3$ and based upon the total hydrotreating catalyst weight, and said chromium is present in an amount within the range of about 5 wt.% to about 20 wt.%, calculated as Cr$_2$O$_3$ and based upon the total hydrotreating catalyst weight.

13. The process of claim 4, which process includes contacting said stream in a demetallization zone under demetallization conditions and in the presence of hydrogen with a demetallization catalyst prior to contacting said stream in said hydrotreating zone with said hydrotreating catalyst.

14. The process of claim 4, wherein said portion of said hydrotreated product stream is blended with a gas oil to form a blend prior to being catalytically cracked in said catalytic cracking zone.

15. The process of claim 5, wherein said cobalt is present in an amount within the range of about 0.1 wt.% to about 5 wt.%, calculated as CoO and based upon the total hydrotreating catalyst weight, said molybdenum is present in an amount within the range of about 5 wt.% to about 15 wt.%, calculated as MoO$_3$ and based upon the total hydrotreating catalyst weight, and said chromium is present in an amount within the range of about 5 wt.% to about 20 wt.%, calculated as Cr$_2$O$_3$ and based upon the total hydrotreating catalyst weight.

16. The process of claim 5, wherein said hydrotreating catalyst has about 0% to about 10% of its pore volume in pores having diameters that are smaller than 50 Å (5 nm), about 30% to about 80% of its pore volume in pores having diameters of about 50 Å (5 nm) to about 100 Å (10 nm), about 10% to about 50% of its pore volume in pores having diameters of about 100 Å (10 nm) to about 150 Å (15 nm), and about 0% to about 10% of its pore volume in pores having diameters that are larger than 150 Å (15 nm).

17. The process of claim 5, wherein said hydrotreating conditions comprise a hydrogen partial pressure within the range of about 1,000 psia (6.9 MPa) to about 3,000 psia (20.7 MPa), an average catalyst bed temperature within the range of about 700° F. (371° C.) to about 820° F. (438° C.), an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB (356 m³/m³) to about 15,000 SCFB (2,672 m³/m³).

18. The process of claim 9, wherein said hydrotreating conditions comprise a hydrogen partial pressure within the range of about 1,000 psia (6.9 MPa) to about 3,000 psia (20.7 MPa), an average catalyst bed temperature within the range of about 700° F. (371° C.) to about 820° F. (438° C.), an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB (356 m³/m³) to about 15,000 SCFB (2,672 m³/m³).

19. The process of claim 10, wherein said portion of said hydrotreated product stream is blended with a gas oil to form a blend prior to being catalytically cracked in said catalytic cracking zone.

20. The process of claim 12, wherein said portion of said hydrotreated product stream is blended with a gas oil to form a blend prior to being catalytically cracked in said catalytic cracking zone.

21. The process of claim 12, which process includes contacting said stream in a demetallization zone under demetallization conditions and in the presence of hydrogen with a demetallization catalyst prior to contacting said stream in said hydrotreating zone with said hydrotreating catalyst.

22. The process of claim 13, wherein said portion of said hydrotreated product stream is blended with a gas oil to form a blend prior to being catalytically cracked in said catalytic cracking zone.

23. The process of claim 15, wherein said portion of said hydrotreated product stream is blended with a gas oil to form a blend prior to being catalytically cracked in said catalytic cracking zone.

24. The process of claim 15, which process includes contacting said stream in a demetallization zone under demetallization conditions and in the presence of hydrogen with a demetallization catalyst prior to contacting said stream in said hydrotreating zone with said hydrotreating catalyst.

25. The process of claim 15, wherein said hydrotreating conditions comprise a hydrogen partial pressure within the range of about 1,000 psia (6.9 MPa) to about 3,000 psia (20.7 MPa), an average catalyst bed temperature within the range of about 700° F. (371° C.) to about 820° F. (438° C.), an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB (356 m³/m³) to about 15,000 SCFB (2,672 m³/m³).

26. The process of claim 16, wherein said cobalt is present in an amount within the range of about 0.1 wt.% to about 5 wt.%, calculated as CoO and based upon the total hydrotreating catalyst weight, said molybdenum is present in an amount within the range of about 5 wt.% to about 15 wt.%, calculated as MoO₃ and based upon the total hydrotreating catalyst weight, and said chromium is present in an amount within the range of about 5 wt.% to about 20 wt.%, calculated as Cr₂O₃ and based upon the total hydrotreating catalyst weight.

27. The process of claim 16, which process includes contacting said stream in a demetallization zone under demetallization conditions and in the presence of hydrogen with a demetallization catalyst prior to contacting said stream in said hydrotreating zone with said hydrotreating catalyst.

28. The process of claim 16, wherein said portion of said hydrotreated product stream is blended with a gas oil to form a blend prior to being catalytically cracked in said catalytic cracking zone.

29. The process of claim 21, wherein said portion of said hydrotreated product stream is blended with a gas oil to form a blend prior to being catalytically cracked in said catalytic cracking zone.

30. The process of claim 26, wherein said portion of said hydrotreated product stream is blended with a gas oil to form a blend prior to being catalytically cracked in said catalytic cracking zone.

31. The process of claim 26, which process includes contacting said stream in a demetallization zone under demetallization conditions and in the presence of hydrogen with a demetallization catalyst prior to contacting said stream in said hydrotreating zone with said hydrotreating catalyst.

32. The process of claim 26, wherein said hydrotreating conditions comprise a hydrogen partial pressure within the range of about 1,000 psia (6.9 MPa) to about 3,000 psia (20.7 MPa), an average catalyst bed temperature within the range of about 700° F. (371° C.) to about 820° F. (438° C.), an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB (356 m³/m³) to about 15,000 SCFB (2,672 m³/m³).

33. The process of claim 27, wherein said portion of said hydrotreated product stream is blended with a gas oil to form a blend prior to being catalytically cracked in said catalytic cracking zone.

34. The process of claim 30, wherein said hydrotreating conditions comprise a hydrogen partial pressure within the range of about 1,000 psia (6.9 MPa) to about 3,000 psia (20.7 MPa), an average catalyst bed temperature within the range of about 700° F. (371° C.) to about 820° F. (438° C.), an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB (356 m³/m³) to about 15,000 SCFB (2,672 m³/m³).

35. The process of claim 31, wherein said portion of said hydrotreated product stream is blended with a gas oil to form a blend prior to being catalytically cracked in said catalytic cracking zone.

* * * * *